US012720496B2

(12) United States Patent
Dutta et al.

(10) Patent No.: US 12,720,496 B2
(45) Date of Patent: Aug. 25, 2026

(54) RESOURCE EXCLUSION PROCEDURES FOR RESOURCE SELECTION FOR A MULTIPLE TRANSMITTER-RECEIVER POINT USER EQUIPMENT

(71) Applicant: QUALCOMM Incorporated, San Diego, CA (US)

(72) Inventors: Sourjya Dutta, San Diego, CA (US); Kapil Gulati, Belle Mead, NJ (US); Junyi Li, Fairless Hills, PA (US); Hui Guo, Beijing (CN); Shuanshuan Wu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 770 days.

(21) Appl. No.: 18/000,462

(22) PCT Filed: Jul. 29, 2020

(86) PCT No.: PCT/CN2020/105450

§ 371 (c)(1),
(2) Date: Dec. 1, 2022

(87) PCT Pub. No.: WO2022/021127

PCT Pub. Date: Feb. 3, 2022

(65) Prior Publication Data

US 2023/0254816 A1 Aug. 10, 2023

(51) Int. Cl.

*H04W 72/02* (2009.01)
*H04W 72/25* (2023.01)
*H04W 72/54* (2023.01)

(52) U.S. Cl.

CPC .......... *H04W 72/02* (2013.01); *H04W 72/25* (2023.01); *H04W 72/54* (2023.01)

(58) Field of Classification Search

None
See application file for complete search history.

(56) References Cited

U.S. PATENT DOCUMENTS

2017/0188391 A1 6/2017 Rajagopal et al.
2018/0063816 A1 3/2018 Gulati et al.
(Continued)

FOREIGN PATENT DOCUMENTS

CN 110972176 A 4/2020
CN 111149397 A 5/2020
(Continued)

OTHER PUBLICATIONS

Supplementary European Search Report—EP20947722—Search Authority—The Hague—Apr. 3, 2024.
(Continued)

*Primary Examiner* — Marcus Smith
*Assistant Examiner* — Rowan K Fakhro
(74) *Attorney, Agent, or Firm* — Harrity & Harrity, LLP

(57) ABSTRACT

Various aspects of the present disclosure generally relate to wireless communication. In some aspects, a user equipment (UE) may determine a set of available resources for a sidelink transmission by performing an iterative resource exclusion procedure, wherein performing the iterative resource exclusion procedure comprises determining, for an iteration, a set of potentially available resources that is based at least in part on a primary resource set and an auxiliary resource set, wherein the auxiliary resource set comprises a first resource of a set of sidelink resources in a resource selection window having a corresponding reference signal received power (RSRP) measurement that is less than an RSRP measurement corresponding to a second resource, and wherein the primary resource set includes the second resource. The UE may transmit the sidelink transmission
(Continued)

using the set of available resources and at least one transmitter-receiver point of the UE. Numerous other aspects are provided.

33 Claims, 7 Drawing Sheets

(56) References Cited

U.S. PATENT DOCUMENTS

| | | | | |
|---|---|---|---|---|
| 2020/0029340 | A1 | 1/2020 | He et al. | |
| 2020/0153554 | A1 | 5/2020 | Nguyen et al. | |
| 2020/0229171 | A1 | 7/2020 | Khoryaev et al. | |
| 2021/0306961 | A1* | 9/2021 | Dutta | H04L 1/08 |
| 2021/0314966 | A1* | 10/2021 | Hui | H04W 72/20 |
| 2022/0015071 | A1* | 1/2022 | Hui | H04W 72/56 |

FOREIGN PATENT DOCUMENTS

| | | | | |
|---|---|---|---|---|
| CN | 111436079 A | 7/2020 | | |
| EP | 3672338 A1 | 6/2020 | | |
| WO | 2018031086 A1 | 2/2018 | | |
| WO | 2018039079 | 3/2018 | | |
| WO | WO-2020164012 A1 * | 8/2020 | | H04W 72/00 |

OTHER PUBLICATIONS

International Search Report and Written Opinion—PCT/CN2020/105450—ISA/EPO—Apr. 23, 2021.

* cited by examiner

700

RESOURCE EXCLUSION PROCEDURES FOR RESOURCE SELECTION FOR A MULTIPLE TRANSMITTER-RECEIVER POINT USER EQUIPMENT

CROSS-REFERENCE TO RELATED APPLICATION

This Patent Application is a 371 national stage of PCT Application No. PCT/CN2020/105450 filed on Jul. 29, 2020, entitled "RESOURCE EXCLUSION PROCEDURES FOR RESOURCE SELECTION FOR A MULTIPLE TRANSMITTER-RECEIVER POINT USER EQUIPMENT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for resource exclusion procedures for resource selection for a multiple transmitter-receiver point user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining a set of available resources for a sidelink transmission by performing an iterative resource exclusion procedure, wherein performing the iterative resource exclusion procedure comprises determining, for an iteration of a plurality of iterations, a set of potentially available resources that is based at least in part on a primary resource set and an auxiliary resource set, wherein the auxiliary resource set comprises a first resource of a set of sidelink resources in a resource selection window having a corresponding reference signal received power (RSRP) measurement that is less than an RSRP measurement corresponding to a second resource of the set of sidelink resources, wherein the primary resource set includes the second resource; and transmitting the sidelink transmission using the set of available resources and at least one transmitter-receiver point (TRP) of a plurality of TRPs of the UE.

In some aspects, a UE for wireless communication includes a memory; and one or more processors operatively coupled to the memory, the memory and the one or more processors configured to determine a set of available resources for a sidelink transmission by performing an iterative resource exclusion procedure, wherein performing the iterative resource exclusion procedure comprises determining, for an iteration of a plurality of iterations, a set of potentially available resources that is based at least in part on a primary resource set and an auxiliary resource set, wherein the auxiliary resource set comprises a first resource of a set of sidelink resources in a resource selection window having a corresponding RSRP measurement that is less than an RSRP measurement corresponding to a second resource of the set of sidelink resources, wherein the primary resource set includes the second resource; and transmit the sidelink transmission using the set of available resources and at least one TRP of a plurality of TRPs of the UE.

In some aspects, a non-transitory computer-readable medium storing a set of instructions for wireless communication includes: one or more instructions that, when executed by one or more processors of a UE, cause the UE to determine a set of available resources for a sidelink transmission by performing an iterative resource exclusion procedure, wherein performing the iterative resource exclusion procedure comprises determining, for an iteration of a plurality of iterations, a set of potentially available resources that is based at least in part on a primary resource set and an auxiliary resource set, wherein the auxiliary resource set comprises a first resource of a set of sidelink resources in a resource selection window having a corresponding RSRP measurement that is less than an RSRP measurement corresponding to a second resource of the set of sidelink resources, wherein the primary resource set includes the second resource; and transmit the sidelink transmission using the set of available resources and at least one TRP of a plurality of TRPs of the UE.

In some aspects, an apparatus for wireless communication includes means for determining a set of available resources for a sidelink transmission by performing an iterative resource exclusion procedure, wherein performing the iterative resource exclusion procedure comprises determining, for an iteration of a plurality of iterations, a set of potentially available resources that is based at least in part on a primary resource set and an auxiliary resource set, wherein the auxiliary resource set comprises a first resource of a set of sidelink resources in a resource selection window having a corresponding RSRP measurement that is less than an RSRP measurement corresponding to a second resource of the set of sidelink resources, wherein the primary resource set includes the second resource; and means for transmitting the sidelink transmission using the set of available resources and at least TRP of a plurality of TRPs of the apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
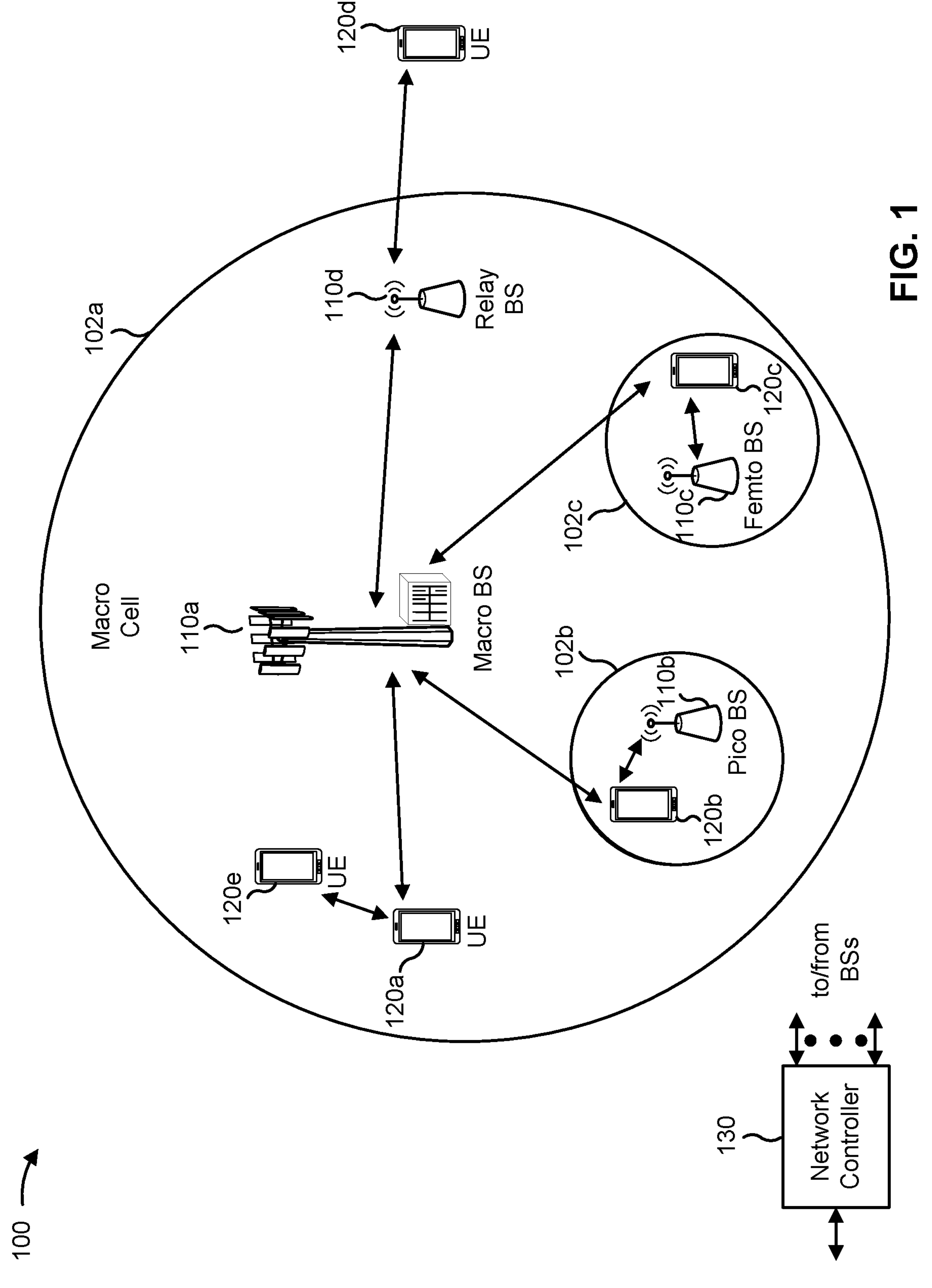
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, vehicle-to-pedestrian (V2P), and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
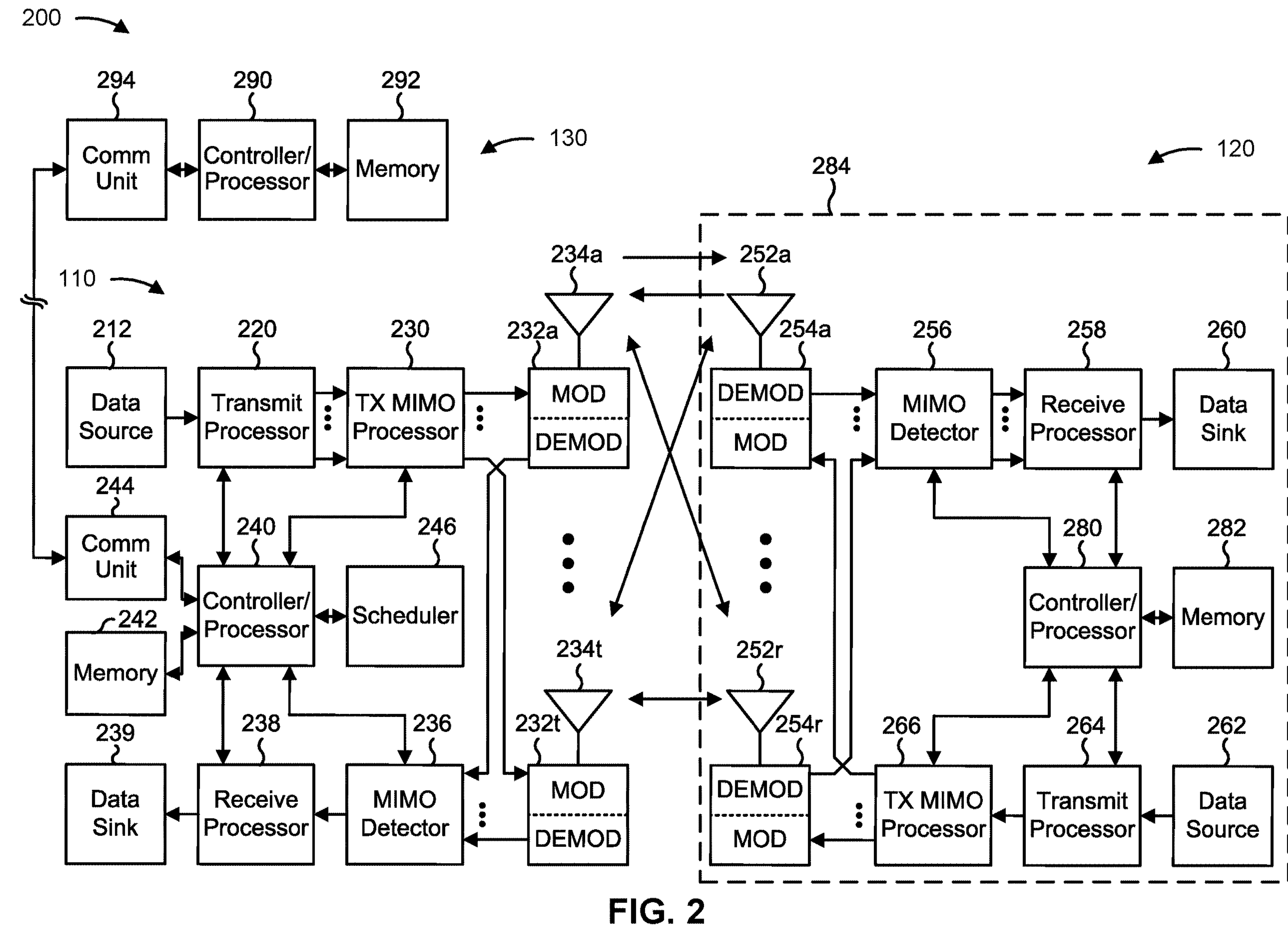
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-7.

Controller/processor 240 of base station 110, controller/processor 280 of UE 120, and/or any other component(s) of FIG. 2 may perform one or more techniques associated with resource exclusion procedures for resource selection for a multiple transmitter-receiver point (mTRP) UE, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, interpreting the instructions, and/or the like.

In some aspects, UE 120 may include means for determining a set of available resources for a sidelink transmission by performing an iterative resource exclusion procedure, wherein performing the iterative resource exclusion procedure comprises determining, for an iteration of a plurality of iterations, a set of potentially available resources that is based at least in part on a primary resource set and an auxiliary resource set, wherein the auxiliary resource set comprises a first resource of a set of sidelink resources in a resource selection window having a corresponding reference signal received power (RSRP) measurement that is less than an RSRP measurement corresponding to a second resource of the set of sidelink resources, wherein the primary resource set includes the second resource, means for transmitting the sidelink transmission using the set of available resources and at least one transmitter-receiver point (TRP) of a plurality of TRPs of the UE and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
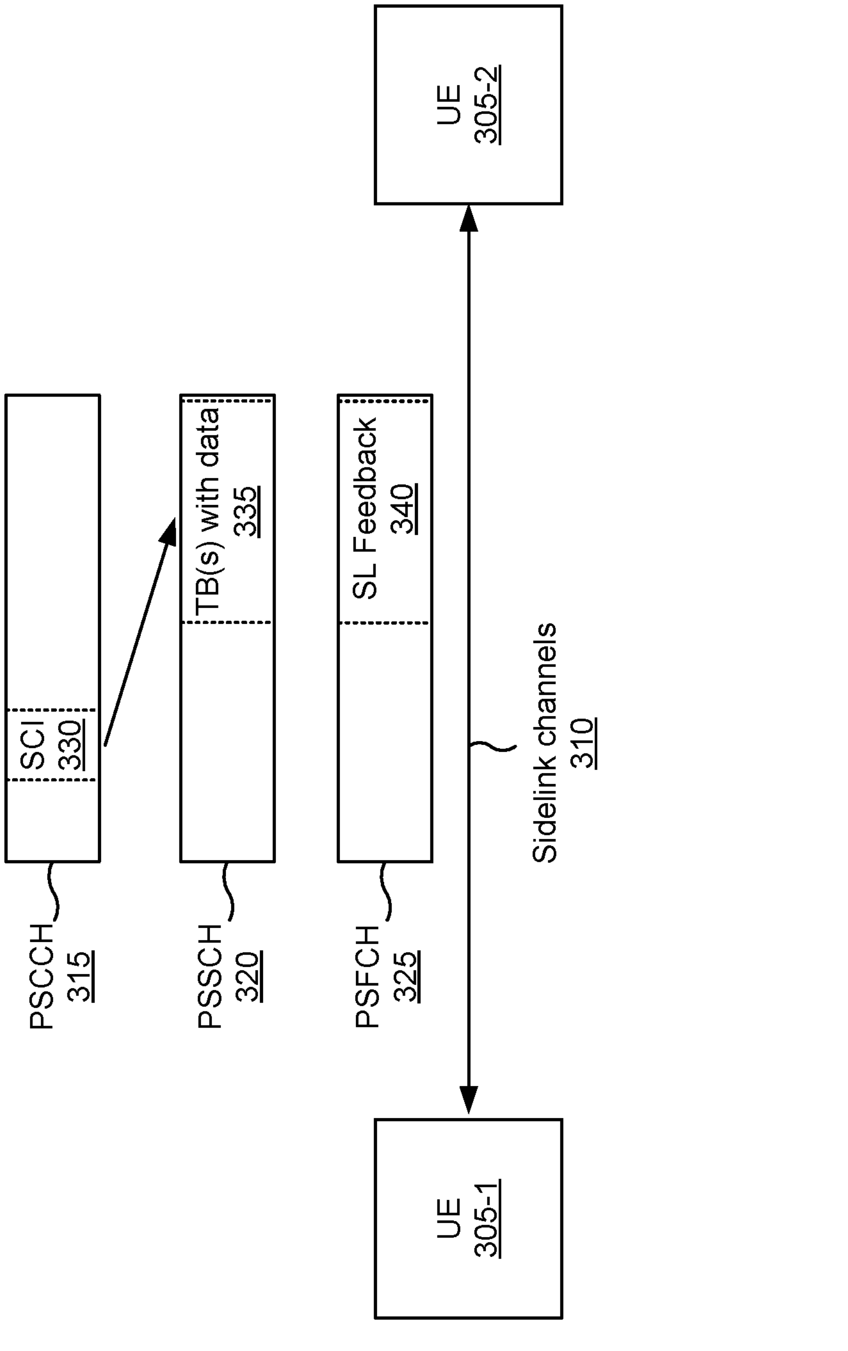
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
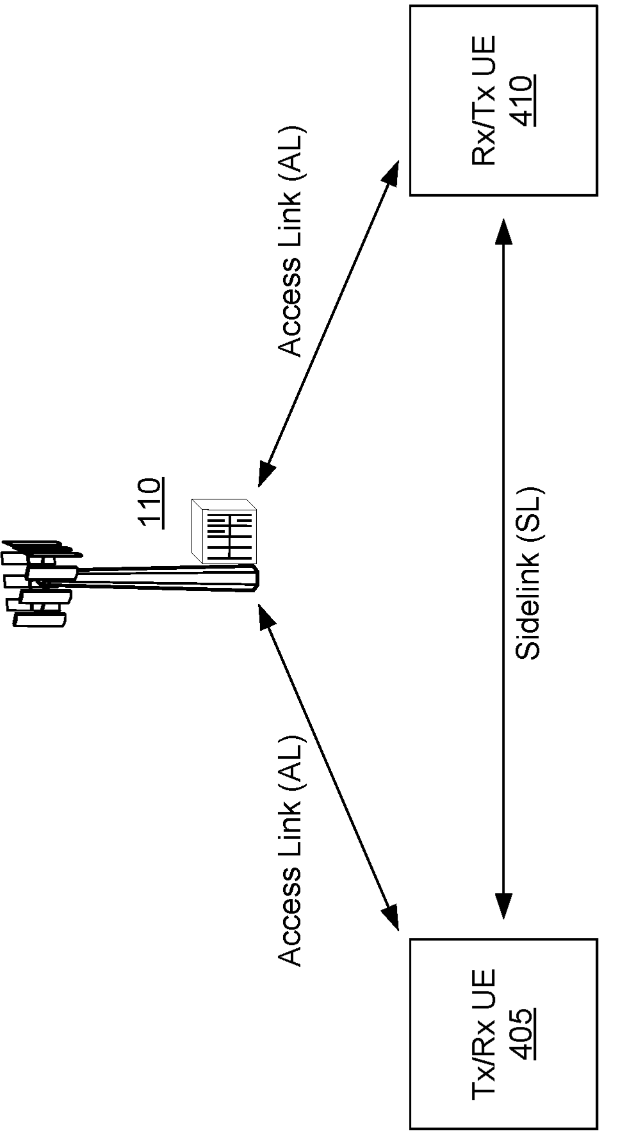
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
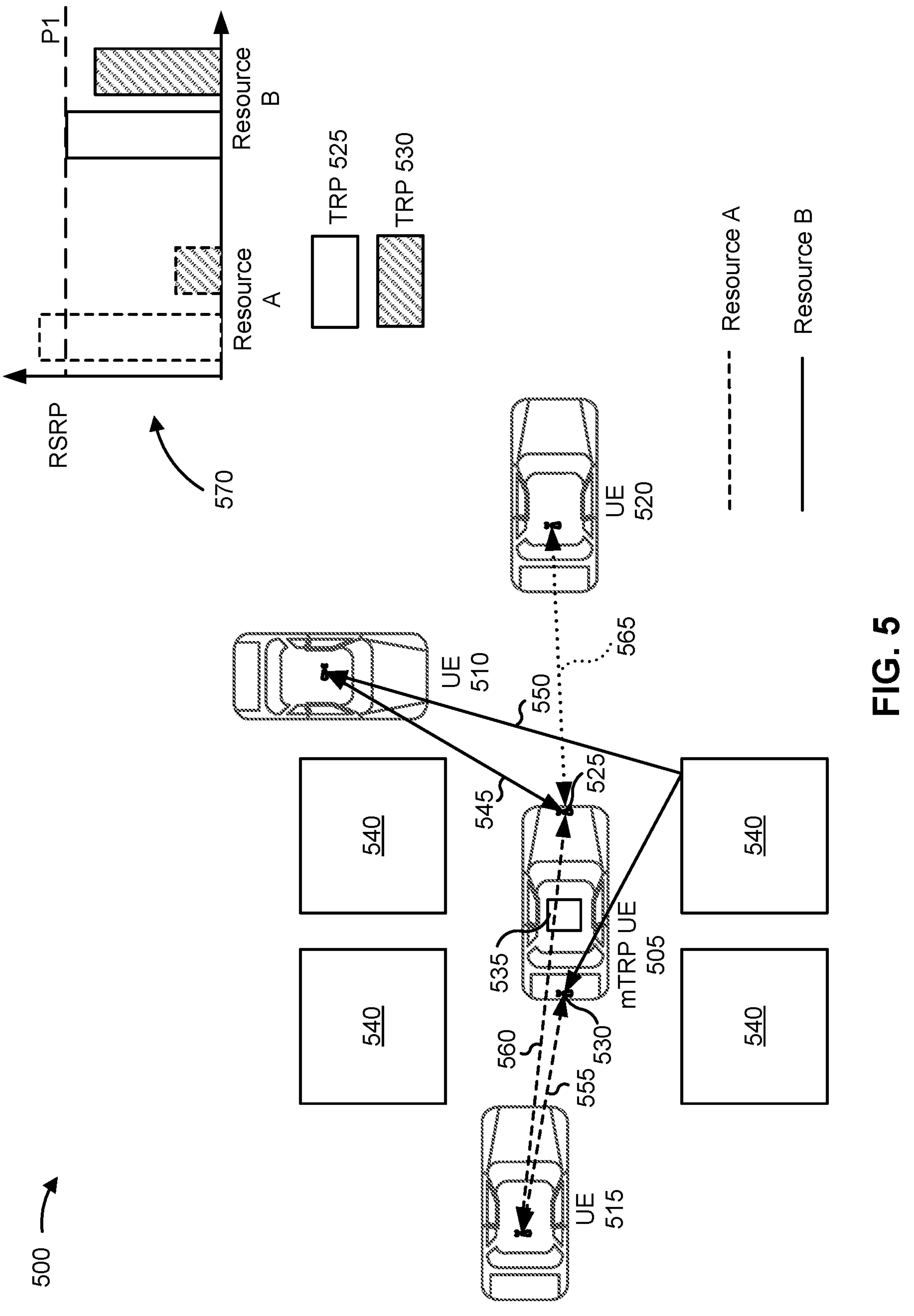
FIG. 5 is a diagram illustrating an example of sidelink communications including a multiple transmitter-receiver point (mTRP) UE, in accordance with various aspects of the present disclosure.

FIG. 5 is a diagram illustrating an example 500 of sidelink communications including an mTRP UE 505, in accordance with various aspects of the present disclosure. As shown, the mTRP UE 505 may communicate with a UE 510, a UE 515, and a UE 520. The UEs 505, 510, 515, and 520 may communicate using sidelink communications.

The UEs 505, 510, 515, and/or 520 may be, be similar to, include, or be included in a UE or UEs as described herein (e.g., UE 120 shown in FIG. 1). In some aspects, the mTRP UE 505 may be, include, or be included in a vehicle (as shown), a trailer, and/or the like. As shown, the UE 510, UE 515, and/or the UE 520 may be, include, or be included in a vehicle (as shown), a trailer, and/or the like. In some aspects, the UE 510, UE 515, and/or the UE 520 may be mTRP UEs. In some aspects, the mTRP UE 505 may communicate with additional UEs not depicted in FIG. 5.

As shown in FIG. 5, the mTRP UE 505 may include a first TRP 525, a second TRP 530, and a controller 535. In some aspects, for example, a car may have front and rear antenna panels. These antenna panels may be TRPs. In some aspects, the mTRP UE 505 may include additional TRPs (not shown in FIG. 5). In some aspects, the controller 535 may include hardware and/or software that controls the first TRP 535 and the second TRP 530. For example, in some aspects, the controller 535 may include one or more processing components, one or more control components, one or more storage components, and/or the like, such as one or more components shown in FIG. 2 (e.g., the DEMOD/MOD 254*a* . . . 254*r*, the MIMO detector 256, the receive processor 258, the data sink 260, the data source 262, the transmit processor 264, the TX MIMO processor 266, the controller/processor 280, the memory 282, and/or the like). In some aspects, the TRP 525 and the TRP 530 may include respective RF components such as analog RF transmitter and/or receiver components, digital processing components, and/or the like, such as one or more components shown in FIG. 2 (e.g., the antennas 252*a* . . . 252*r*, the DEMOD/MOD 254*a* . . . 254*r*, the MIMO detector 256, the receive processor 258, the data sink 260, the data source 262, the transmit processor 264, the TX MIMO processor 266, the controller/processor 280, the memory 282, and/or the like).

In some aspects, TRPs on a vehicle may be spatially separated from one another. For example, in some aspects, a front TRP on a car may be separated from a rear TRP on the car by approximately 3 meters, 4 meters, and/or the like. A front TRP on a 16-wheel trailer may be separated from a rear TRP on the trailer by approximately 20 meters. As a result of any amount of separation, a sidelink communication channel may appear differently to one TRP than to another TRP of the same UE. That is, for example, a first TRP may experience a different signal quality than a second TRP, a different signal power than the second TRP, a different noise level than the second TRP, and/or the like. These differences may be caused by a difference in distance from a device (e.g., UE) with which the TRPs are communicating, lack of line of sight (LoS) with respect to one of the TRPs, signals blocking (e.g., by obstructions in the environment such as other UEs, vehicles, buildings, hills, and/or the like), and/or the like.

As shown in FIG. 5, some environments may include objects 540 that block signals, cause a lack of LoS between UEs, and/or the like. The objects 540 may include any number of different types of obstructing objects such as, for example, buildings, boulders, houses, walls, other vehicles, and/or the like. As shown in FIG. 5, for example, a communication link 545 between the UE 510 and the first TRP 525 may provide a higher quality signal than a communication link 550 between the UE 510 and the second TRP 530. The communication link 550 may be of lower quality due to a greater distance between the UE 510 and the second TRP 530 than between the UE 510 and the first TRP 525, a reflection of the communication link 550 off of an object 540, and/or the like. Similarly, as shown in FIG. 5, for example, a communication link 555 between the UE 510 and the second TRP 530 may provide a higher quality signal than a communication link 560 between the UE 510 and the first TRP 525.

To facilitate communication with a UE (e.g., UE 520), the mTRP UE 505 may select sidelink resources. The sidelink resources may include time domain resources, frequency domain resources, and/or the like. A set of sidelink resources may be identified, based on a packet delay budget, as possible candidate resources. The mTRP UE 505 may select resources by performing an iterative resource exclusion procedure. The resource exclusion procedure may include an iterative procedure in which reference signal received power (RSRP) measurements associated with sidelink resources are compared to RSRP thresholds for resource exclusion. RSRP measurements may be based on SCI transmissions and may represent potential interference associated with the corresponding resources (as they are indications of communications by other UEs using those resources). An RSRP measurement may satisfy an RSRP threshold if the RSRP measurement is lower than or equal to the RSRP threshold. If an RSRP measurement satisfies an RSRP threshold, the resource corresponding to the RSRP measurement may be included in a set of available resources. If the RSRP measurement fails to satisfy the RSRP threshold, the corresponding resource may be excluded. Excluded resources may be considered in a subsequent iteration in which the corresponding RSRP measurement is compared to an updated threshold.

In a typical case, resource exclusion associated with an mTRP UE may include comparing a maximum RSRP measurement of a set of RSRP measurements, across multiple TRPs, corresponding to a resource to an RSRP threshold. When sufficient resources are available, this technique may be effective but can become problematic as the quantity of available resources decreases. For example, as shown in FIG. 5, the mTRP UE 505 may perform a process to select resources for communicating with the UE 520 via a communication link 565.

As the procedure progresses, the mTRP UE 505 may get down to a selection between a resource A and a resource B which may, for example, correspond to the communication links 555, 560 and 545, 550, respectively. As shown by reference number 570, the resource exclusion procedure may include increasing the threshold, incrementally, until it reaches P1, where the maximum RSRP across TRP 1 and TRP 2 satisfies the threshold with respect to resource B. Accordingly, the mTRP UE 505 may select resource B and exclude resource A. However, this selection may be problematic because, as shown, the RSRP (and, thus, the interference) corresponding to resource B and associated with the second TRP (TRP 530) may be much higher than the RSRP corresponding to resource A and associated with the TRP 530, while the RSRP corresponding to resource B and associated with the TRP 525 is only slightly lower than the RSRP corresponding to resource A and associated with the TRP 525. Thus, in this case, transmitting using resource B may result in communication collisions and decreased signal quality due to the interference.

Some aspects of techniques and apparatuses described herein may facilitate sidelink resource selection for an mTRP UE. In some aspects, an mTRP UE may determine a set of available resources for a sidelink transmission by performing an iterative resource exclusion procedure. In some aspects, performing the iterative resource exclusion procedure may include determining, for an iteration, a set of potentially available resources that is based at least in part on a primary resource set and an auxiliary resource set. The auxiliary resource set may include a first resource of a set of sidelink resources in a resource selection window having a corresponding RSRP measurement that is less than an RSRP measurement corresponding to a second resource of the set of sidelink resources that is in the primary resource set. In this way, the mTRP UE may use RSRP measurements to include resources having lower interference than other resources and that may otherwise be excluded, thereby effectively relaxing the resource exclusion criteria. As a result, aspects may facilitate avoidance of unnecessary communication collisions, sidelink communications with less interference, and/or the like.

In some aspects, the mTRP UE may perform a power control procedure in which the mTRP UE increases or decreases the transmission power of one or more TRPs relative to one or more other TRPs. In this way, techniques and apparatuses described herein may further facilitate emphasizing indicated transmission directions, TRPs with lower interference associated with available resources, and/or the like. In some aspects, control channel transmissions may be transmitted from multiple TRPs at the same power, while data channel transmissions may be transmitted from multiple TRPs at different power levels. In this way, aspects may facilitate emphasizing indicated transmission directions while still facilitating providing SCI information to all nearby receiving devices, thereby facilitating avoidance of unnecessary communication collisions.

As indicated above, FIG. 5 is provided as an example. Other examples may differ from what is described with respect to FIG. 5.

Figure 6:
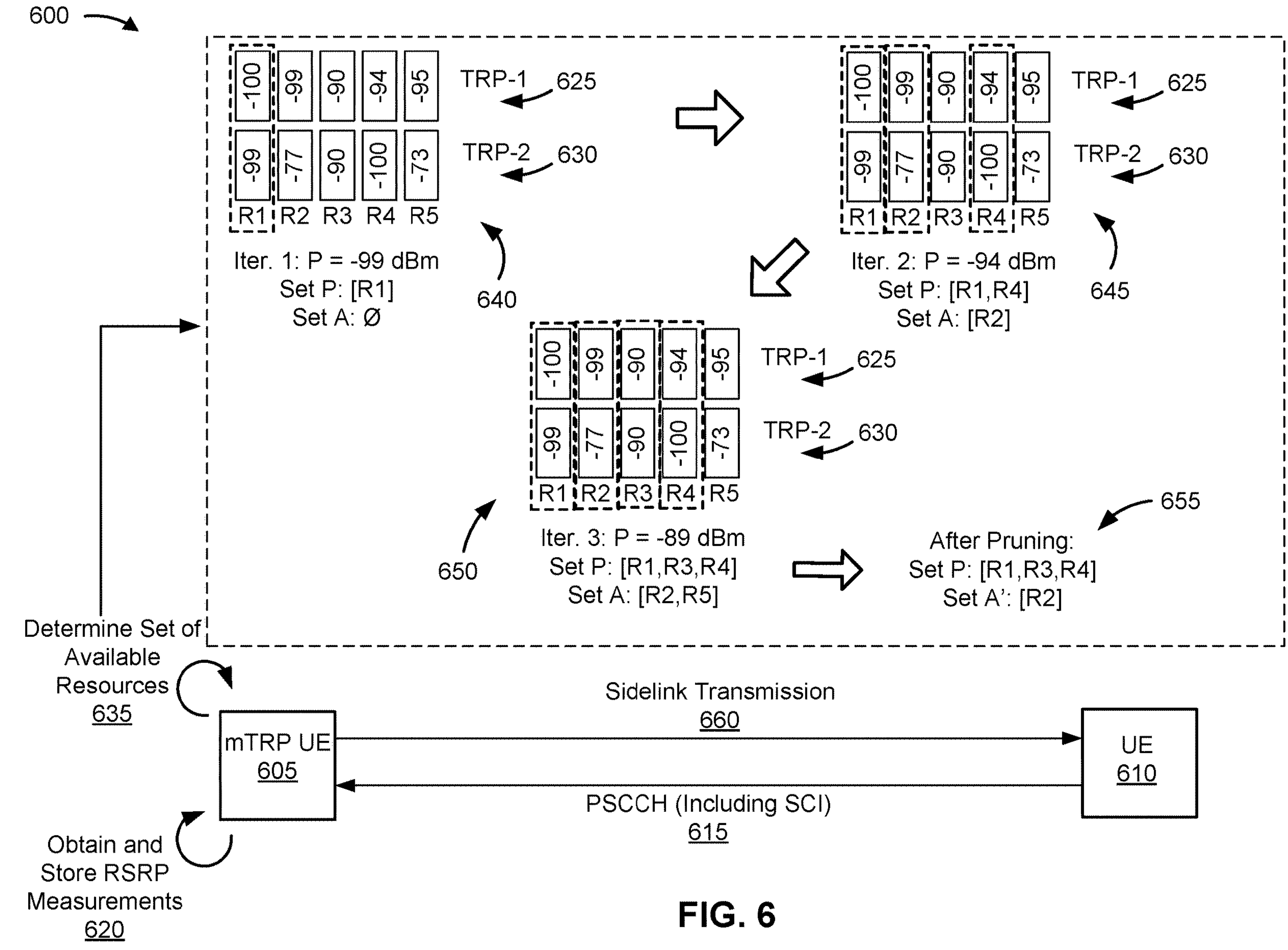
FIG. 6 is a diagram illustrating an example associated with resource exclusion procedures for resource selection for an mTRP UE, in accordance with various aspects of the present disclosure.

FIG. 6 is a diagram illustrating an example 600 associated with sidelink resource selection for an mTRP UE, in accordance with various aspects of the present disclosure. As shown, an mTRP UE 605 and a UE 610 may communicate with one another. In some aspects, the MTRP UE 605 may be, be similar to, include, or be included in the UE 120 shown in FIGS. 1 and 2, the mTRP UE 505 shown in FIG. 5, and/or the like. In some aspects, the UE 610 may be, be similar to, include, or be included in the UE 120 shown in FIGS. 1 and 2, the UE 510 shown in FIG. 5, the UE 515 shown in FIG. 5, and/or the like.

As shown by reference number 615, the UE 610 may transmit, and the mTRP UE 605 may receive, a physical sidelink control channel (PSCCH) transmission. The PSCCH transmission may include sidelink control information (SCI). The mTRP UE 605 may decode the PSCCH transmission to extract the SCI. In some aspects, the mTRP UE 605 may use the SCI to facilitate resource selection.

As shown by reference number 620, the mTRP UE 605 may obtain and store RSRP measurements associated with the TRPs. In some aspects, the RSRP measurements may be associated with corresponding TRPs and stored in resource maps. In some aspects, for example, a first resource map 625 may correspond to a first TRP (shown as "TRP-1" in FIG. 6) and a second resource map 630 may correspond to a second TRP (shown as "TRP-2" in FIG. 6). In some aspects, additional resource maps may be generated corresponding to additional TRPs. As shown, a resource map (e.g., the first resource map 625, the second resource map 630, and/or the like) may indicate a set of potentially available resources (shown as "R1, R2, . . . , R5"). In some aspects, the set of potentially available resources may include time domain resources, frequency domain resources, and/or the like.

The resource maps 625 and 630 may indicate a characteristic (e.g., an RSRP) associated with a resource element. For example, as shown in FIG. 6, the resource maps 625 and 630 may be conceptualized as a number of boxes arranged in columns representing resource elements and rows representing associated TRPs. A number may be included within a box of the conceptualization that represents a measurement corresponding to a resource element indicated by the column of the box and obtained using a TRP indicated by the row of the box. In some aspects, a resource map corresponding to a TRP may be stored, by the mTRP UE 605, as a bitmap, table, and/or the like. In some aspects, the mTRP UE 605 may store a first resource map 625 associated with a first TRP (TRP-1), a second resource map 630 associated with a second TRP (TRP-2), and/or the like.

For example, in some aspects, the mTRP UE 605 may obtain, using the first TRP (TRP-1), a first RSRP measurement corresponding to at least one resource and, using the second TRP (TRP-2), a second RSRP measurement corresponding to the at least one resource. In some aspects, the mTRP UE 605 may obtain an RSRP measurement corresponding to a resource based at least in part on the extracted SCI. RSRP measurements may be used for resource exclusion because RSRP measurements provide information about potential interference on a channel. That is, for example, if an SCI associated with a particular sidelink resource is received with a relatively high RSRP, the mTRP UE 605 may conclude that the UE from which that SCI is received is transmitting at a high power, from within a relatively close range, and/or the like.

As shown, the mTRP UE 605 may obtain, using the first TRP (TRP-1), an RSRP measurement of −100 decibel-milliwatts (dBm) corresponding to R1, as represented by the number in the box in the first row and first column. In some aspects, although an RSRP measurement is a measurement of power and, thus, might generally be expressed in terms of milliwatts (mW), -dBm may be used to express RSRP measurements for clarity. A negative decibel-milliwatt represents small but positive numbers on a logarithmic scale, thus making the numbers easier to understand and more useful for calculation. The value indicated represents a negative exponent so that, for example, 0 dBm corresponds to 1 mW of power, −10 dBm corresponds to 0.1 mW, −20 dBm corresponds to 0.01 mW, and so on. Thus, the closer the RSRP measurement is to 0, the higher the RSRP (and, thus, the interference on the corresponding channel) is. As a result, for example, an RSRP measurement of −45 represents a higher RSRP (and a higher level of interference) than an RSRP measurement of −75.

As shown in FIG. 6, the mTRP UE 605 may obtain, using the first TRP (TRP-1), an RSRP measurement of −99 dBm corresponding to R2, an RSRP measurement of −90 dBm corresponding to R3, an RSRP measurement of −94 dBm corresponding to R4, and an RSRP measurement of −95 dBm corresponding to R5. Similarly, the mTRP UE 605 may obtain, using the second TRP (TRP-2), an RSRP measurement of −99 dBm corresponding to R1, an RSRP measurement of −77 dBm corresponding to R2, an RSRP measurement of −90 dBm corresponding to R3, an RSRP measurement of −100 dBm corresponding to R4, and an RSRP measurement of −73 dBm corresponding to R5. The obtained RSRP measurements may be stored in the corresponding resource maps 625, 630.

As shown by reference number 635, the mTRP UE 605 may determine a set of available resources for a sidelink transmission. In some aspects, the set of available resources may include time domain resources, frequency domain resources, and/or the like. In some aspects, the mTRP UE 605 may determine the set of available resources using a resource exclusion procedure. In some aspects, the resource exclusion procedure may be biased based at least in part on an indication of a directional bias. In some aspects, the indication may indicate a direction (e.g., North, South, East, West, Northwest, Southeast, Northeast, Southwest, right, left, up, down, and/or the like), a TRP (e.g., TRP-1, TRP-2, and/or the like), and/or the like. In some aspects, the mTRP UE 605 may receive the indication from an application layer of the mTRP UE 605 (e.g., by a physical (PHY) layer, a medium access control (MAC) layer, and/or the like).

As shown by reference number 640, the mTRP UE 605 may perform the resource exclusion procedure by setting a first RSRP threshold, P, and comparing the maximum RSRP measurement across TRPs for a resource with the RSRP threshold, P. For example, as shown by reference number 640, in a first iteration of the resource exclusion procedure, the first RSRP threshold, P, may be set to −99 dBm. In some aspects, the resource exclusion procedure for an mTRP UE 605 includes determining whether a maximum RSRP measurement corresponding to at least one resource of the set of potentially available resources satisfies the RSRP threshold. For example, as shown by reference number 640, there is one resource (R1) for which the corresponding maximum RSRP measurement satisfies the RSRP threshold.

As is further shown by reference number 640, the mTRP UE 605 may determine a primary resource set, Set P, and an auxiliary resource set, Set A. In some aspects, the mTRP UE 605 may determine the primary resource set, Set P, by obtaining, using a first TRP, a first RSRP measurement corresponding to at least one resource of a set of sidelink resources; obtaining, using a second TRP, a second RSRP measurement corresponding to the at least one resource of the set of sidelink resources; and determining that at least one of the first RSRP measurement or the second RSRP measurement satisfies the RSRP threshold. In some aspects, the mTRP UE 605 may determine a derived RSRP measurement based at least in part on a linear combination of the first RSRP measurement and the second RSRP measurement and determine whether the derived RSRP measurement satisfies the RSRP threshold. In either case, any resources having an associated RSRP measurement, or derived RSRP measurement, that satisfies the RSRP threshold may be included in the primary resource set, Set P. In FIG. 6, because the maximum RSRP measurement across the TRPs, or derived RSRP measurement, associated with R1 is −99 dBm, which is equal to the threshold, P, of −99 dBm, R1 is included in the primary resource set, Set P, as shown.

As indicated above, the mTRP UE 605 may determine an auxiliary resource set, Set A. In some aspects, the mTRP UE 605 may determine an auxiliary resource set, Set A, based at least in part on determining that the RSRP threshold satisfies a trigger threshold. In this way, some aspects may facilitate determining an auxiliary resource set when enough resources are not available to enable the mTRP UE 605 to select sidelink resources using a resource exclusion procedure that does not include determining auxiliary resource sets.

In some aspects, the mTRP UE 605 may determine the auxiliary resource set, Set A, by determining a resource for which an RSRP measurement is less than an RSRP measurement corresponding to a resource of the primary set. In some aspects, inclusion in the auxiliary resource set, Set A, based on the difference between the RSRP measurements may be constrained using a threshold parameter. In some aspects, for example, the mTRP UE 605 may determine the auxiliary resource set, Set A, by determining that an RSRP measurement, $$RSRP_i^m,$$

corresponding to a resource in the primary resource set, Set P, is greater than or equal to a sum of the RSRP measurement, $$RSRP_j^m,$$

corresponding to the excluded resource and a value of the threshold parameter, ρ.

$$RSRP_i^m \geq RSRP_j^m + \rho,$$

where i is an index of a resource in the primary set, j is an index of an excluded resource, and m is an index of a TRP of the mTRP UE 605. In FIG. 6, the threshold parameter, ρ, may be, for example, +5 dBm. In that case, as shown by reference number 640, for the first iteration, none of the excluded resources are added to the auxiliary resource set, Set A.

As shown by reference number 645, the RSRP threshold may be updated by an RSRP exclusion step size, and the RSRP measurements may be compared to the updated RSRP threshold. For example, as shown, the RSRP threshold may be updated (increased) by a step size of 5 dBm. In some aspects, a different step size may be used to update the respective RSRP thresholds. As shown by reference number 645, the maximum RSRP measurement corresponding to R4 (obtained by TRP-1) satisfies the updated RSRP threshold. Thus, R4 may be included in the primary set, Set P, along with R1, as shown.

As is also shown by reference number 645, the mTRP UE 605 may determine that an RSRP measurement associated with R2, when added to the threshold parameter, ρ+5 dBM, is less than or equal to an RSRP measurement of a resource in the primary set. For example, the RSRP measurement obtained by TRP-1 corresponding to R2 is −99 dBm and the sum of −99 dBm and +5 dBm is −94 dBm, which is equal to the RSRP measurement obtained by TRP-1 corresponding to R4. Thus, the mTRP UE 605 may add R2 to the auxiliary set, Set A, as shown.

According to some aspects, the mTRP UE 605 may prune the auxiliary set, Set A, to determine a pruned auxiliary resource set, Set A'. In some aspects, the mTRP UE 605 may prune the auxiliary resource set by determining a maximum RSRP measurement corresponding to at least one resource of the auxiliary resource set and determining that the maximum RSRP measurement satisfies a pruning threshold, a. For example, the mTRP UE 605 may remove a resource, i, from the auxiliary resource set, Set A, if:

$$maxRSRP_i^m > \propto,$$

where m indicates an index of the TRPs of the mTRP UE 605. As shown in FIG. 6, for example, if a pruning threshold, α, is equal to −75 dBm, then in the second iteration (shown as "Iter. 2") of the resource exclusion procedure, nothing is removed from the auxiliary resource set, Set A (since the maximum RSRP corresponding to R2 is −77 dBm, which is less than −75 dBm).

In some aspects, the mTRP UE 605 may prune the auxiliary resource set based at least in part on applying a quantity threshold, n. In some aspects, the mTRP UE 605 may apply the quantity threshold where the mTRP UE 605 has more than two TRPs (e.g., where m>2). In some aspects, the mTRP UE 605 may determine maximum RSRP measurements corresponding to at least one resource of the auxiliary resource set. The maximum RSRP measurement of the maximum RSRP measurements may be associated with a TRP. The mTRP UE 605 may determine that the maximum RSRP measurements satisfy a pruning threshold, α, and that a quantity of maximum RSRP measurements satisfies the quantity threshold, n. The mTRP UE 605 may remove the at least one resource from the auxiliary resource set based at least in part on determining that the quantity of the maximum RSRP measurements satisfies the quantity threshold.

In some aspects, the mTRP UE 605 may prune the primary resource set, Set P, to determine a pruned primary resource set, Set P'. In some aspects, the mTRP UE 605 may prune the primary resource set, Set P, by determining for each TRP, a maximum auxiliary RSRP measurement, $$\theta_m = \max_{i \in Set\ A} RSRP_i^m,$$

associated with the auxiliary resource set or a pruned auxiliary resource set and determining that the maximum auxiliary RSRP measurement, $\theta_m$, is less than an RSRP measurement, $$RSRP_j^m,$$

corresponding to at least one resource, j, in the primary resource set, Set P, and associated with the TRP m. In some aspects, the mTRP UE 605 may remove the resource(s), j, from the primary resource set, Set P, based at least in part on determining that $$\theta_m < RSRP_j^m.$$

As shown by reference number 645, the primary set, Set P, is not pruned because the maximum auxiliary measurement, $\theta_m$, equals −77 dBm, which is greater than all of the RSRP measurements associated with the resources, R1 and R4, in the primary set, Set P.

According to various aspects, the mTRP UE 605 may determine a set of potentially available resources by determining a union of the primary resource set, Set P, and the auxiliary resource set, Set A. In some aspects, the mTRP UE 605 may determine the set of potentially available resources by determining a union of a pruned primary resource set, Set P', and the auxiliary resource set, Set A. In some aspects, the mTRP UE 605 may determine the set of potentially available resources by determining a union of the primary resource set, Set P, and a pruned auxiliary resource set, Set A'. In some aspects, the mTRP UE 605 may determine the set of potentially available resources by determining a union of the pruned primary resource set, Set P', and the pruned auxiliary resource set, Set A'.

In some aspects, the resource exclusion procedure may include a stopping condition. The stopping condition may be a number of potentially available resources in a set of potentially available resources. For example, in some aspects, the resource exclusion procedure may be terminated based at least in part on a specified number of resources being potentially available (e.g., two, three, four, and/or the like), a ratio of potentially available resources to candidate resources, and/or the like. In some aspects, the resource exclusion procedure may be terminated based at least in part on a maximum RSRP threshold or thresholds being reached. In some aspects, the resource exclusion procedure may be terminated based on a maximum number of iterations. As shown in FIG. 6, for example, the stopping condition may be a ratio of 4 available resources to 5 candidate resources, a number of 4 resources, and/or the like. In these cases, as shown, the procedure would proceed to a third iteration (shown as "Iter. 3") because only three resources are determined as potentially available at the end of the second iteration.

As shown by reference number 650, the mTRP UE 605 may perform a third iteration, in which the RSRP threshold may be incremented by the 5 dBm step size to −89 dBm. As shown, R3 may be added to the primary set, Set P, because the maximum RSRP measurement corresponding to R3 is −90 dBm, which is less than −89 dBm. Additionally, R5 may be added to the auxiliary set, Set A, because the RSRP measurement obtained by TRP-1 corresponding to R5 is −95 dBm and the sum of −95 dBm and +5 dBm (the parameter threshold) is −90 dBm, which is less than or equal to −90 dBm, which is the RSRP measurement obtained by both TRP-1 and TRP-2 corresponding to R3.

As shown by reference number 655, the mTRP UE 605 may prune the auxiliary set, Set A, to determine a pruned auxiliary set, Set A'. For example, as shown, the maximum RSRP measurement in Set A equals −73 dBm, which is greater than the pruning threshold, $\alpha=-75$ dBm. As shown by reference number 655, the primary set, Set P, is not pruned because the maximum auxiliary measurement, $\theta_m$, equals −73 dBm, which is greater than all of the RSRP measurements associated with the resources, R1, R3, and R4, in the primary set, Set P. In some aspects, the available resource set may include the union of the primary resource set, Set P, and the pruned auxiliary set, Set A'. In some aspects, the mTRP UE 605 may determine that, because four resources are available, the exclusion procedure may be stopped. In some aspects, the mTRP UE 605 may select one or more resources for transmission from the set of available resources, [R1,R2,R3,R4]. In some aspects, the mTRP UE 605 may select the one or more resources randomly from the set of available resources. In some aspects, the mTRP UE 605 may select the one or more resources using a selection algorithm, selection criterion, and/or the like.

Any number of various alterations to aspects of the resource exclusion procedure described above may be possible. For example, in some aspects, the mTRP UE 605 may use a different calculation to update the RSRP threshold. In some aspects, for example, the mTRP UE 605 may determine, for TRPs, maximum auxiliary RSRP measurements associated with the auxiliary resource set or a pruned auxiliary resource set and may determine a global maximum auxiliary RSRP measurement, $\max\theta_m$, where the global maximum auxiliary RSRP measurement may include a maximum of the maximum auxiliary RSRP measurements. The mTRP UE 605 may set the RSRP threshold equal to the global maximum auxiliary RSRP measurement, $\max\theta_m$.

In some aspects, the mTRP UE 605 may receive an indication of a directional bias. In some aspects, the indication may be received from an application layer of the mTRP UE 605. The mTRP UE 605 may determine a number of bias weights, $\beta_m$,m=1, . . . , M, corresponding to the M TRPs, which may be identified by the index, m. The mTRP UE 605 may determine a number of products of the bias weights multiplied by a number of RSRP measurements associated with the corresponding plurality of TRPs and associated with a particular resource. The mTRP UE 605 may determine that a sum of the products is less than or equal to an RSRP threshold, P, and include the resource in the set of potentially available resources based at least in part on determining that the sum of the products is less than or equal to the RSRP threshold. For example, the mTRP UE 605 may add a resource i that is within a resource selection window to the set of potentially available resources if.

$$\sum_{m=1}^{M}\beta_m \times RSRP_i^m \leq P,$$

where the mTRP UE 605 may stop this bias-based analysis based at least in part on determining that a stopping condition is satisfied (e.g., one of the stopping conditions described above).

As shown by reference number 660, the mTRP UE 605 may transmit the sidelink transmission using the set of available resources and at least one TRP. In some aspects, the mTRP UE 605 may transmit the sidelink transmission at a first transmission power using the first TRP and at a second transmission power using the second TRP. In some aspects, the first transmission power may be greater than the second transmission power. In some aspects, the first transmission power may include a default transmission power and the second transmission power may include a reduced transmission power. In this way, the mTRP UE 605 may use transmission power to further bias a sidelink transmission with respect to an indicated TRP. In some aspects, the mTRP UE 605 may transmit an SCI message associated with the sidelink transmission at the first transmission power using the first TRP and at the first transmission power using the second TRP. In this way, though a data transmission may be directionally biased based on transmission power, control channel signals may be transmitted at the same or similar power to facilitate receipt, by additional receiving UEs, of the control channel signals, which may, for example, indicate resource reservations. As a result, aspects may facilitate reducing potential communication collisions.

In some aspects, the mTRP UE 605 may transmit the sidelink transmission using TRP-based power control based at least in part on determining that a difference between a maximum RSRP measurement associated with the TRPs and a minimum RSRP measurement associated with the TRPs satisfies a difference threshold. In some aspects, the mTRP UE 605 may transmit the sidelink transmission using TRP-based power control based at least in part on the transmission using a resource from an auxiliary resource set or a pruned auxiliary resource set. For example, in some aspects, the mTRP UE 605 may label at least one auxiliary resource in the auxiliary resource set to create at least one labeled resource (e.g., with an aux-sel-bit bit that can be set to 1 to indicate that a corresponding resource is included in an auxiliary resource set or a pruned auxiliary resource set). The mTRP UE 605 may determine that the set of available resources includes the at least one labeled resource and may transmit the sidelink transmission using TRP-based power control based at least in part on determining that the set of available resources comprises the at least one labeled resource.

As indicated above, FIG. 6 is provided as an example. Other examples may differ from what is described with respect to FIG. 6.

Figure 7:
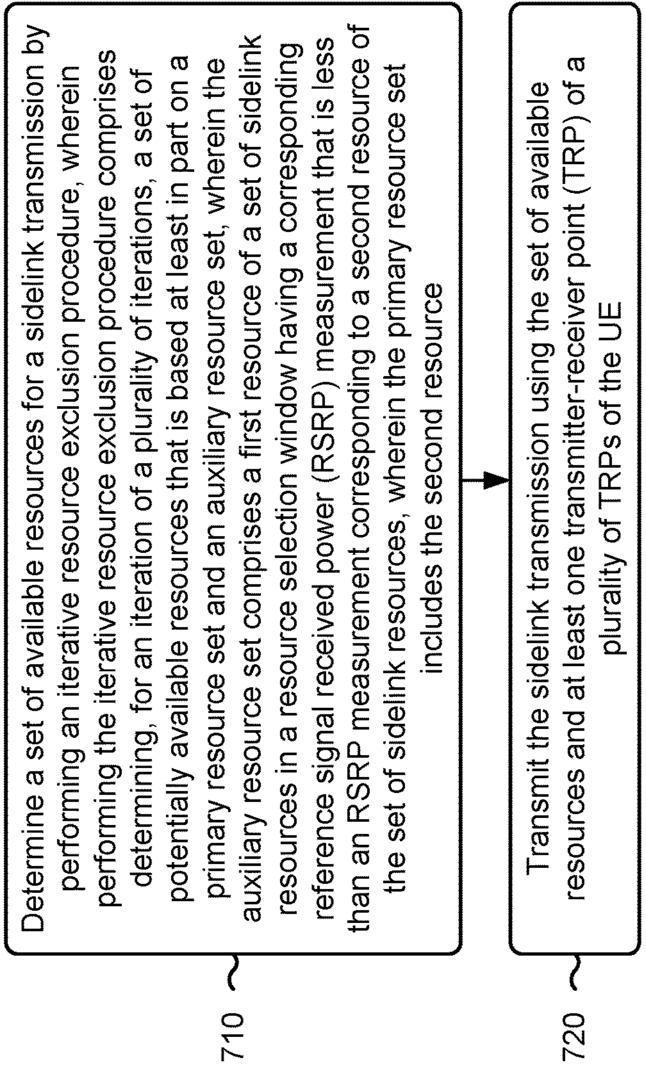
FIG. 7 is a diagram illustrating an example process associated with resource exclusion procedures for resource selection for an mTRP UE, in accordance with various aspects of the present disclosure.
Figure 7:

FIG. 7 is a diagram illustrating an example process 700 performed, for example, by a UE, in accordance with various aspects of the present disclosure. Example process 700 is an example where the UE (e.g., UE 120, mTRP UE 605, and/or the like) performs operations associated with resource exclusion procedures for resource selection for a multiple transmitter-receiver point user equipment.

As shown in FIG. 7, in some aspects, process 700 may include determining a set of available resources for a sidelink transmission by performing an iterative resource exclusion procedure, wherein performing the iterative resource exclusion procedure comprises determining, for an iteration of a plurality of iterations, a set of potentially available resources that is based at least in part on a primary resource set and an auxiliary resource set, wherein the auxiliary resource set comprises a first resource of a set of sidelink resources in a resource selection window having a corresponding RSRP measurement that is less than an RSRP measurement corresponding to a second resource of the set of sidelink resources, wherein the primary resource set includes the second resource (block 710). For example, the UE (e.g., using receive processor 258, transmit processor 264, controller/processor 280, memory 282, and/or the like) may determine a set of available resources for a sidelink transmission by performing an iterative resource exclusion procedure, as described above. In some aspects, performing the iterative resource exclusion procedure comprises determining, for an iteration of a plurality of iterations, a set of potentially available resources that is based at least in part on a primary resource set and an auxiliary resource set. In some aspects, the auxiliary resource set comprises a first resource of a set of sidelink resources in a resource selection window having a corresponding RSRP measurement that is less than an RSRP measurement corresponding to a second resource of the set of sidelink resources. In some aspects, the primary resource set includes the second resource.

As further shown in FIG. 7, in some aspects, process 700 may include transmitting the sidelink transmission using the set of available resources and at least one TRP of a plurality of TRPs of the UE (block 720). For example, the UE (e.g., using transmit processor 264, controller/processor 280, memory 282, and/or the like) may transmit the sidelink transmission using the set of available resources and at least one TRP of a plurality of TRPs of the UE, as described above.

Process 700 may include additional aspects, such as any single aspect or any combination of aspects described below and/or in connection with one or more other processes described elsewhere herein.

In a first aspect, performing the resource exclusion procedure comprises obtaining, using a first TRP of the plurality of TRPs, a first RSRP measurement corresponding to at least one resource of a set of sidelink resources; obtaining, using a second TRP of the plurality of TRPs, a second RSRP measurement corresponding to the at least one resource of the set of sidelink resources, and storing the first RSRP measurement and the second RSRP measurement.

In a second aspect, alone or in combination with the first aspect, the first RSRP measurement is associated with an SCI message and the second RSRP measurement is associated with the SCI message.

In a third aspect, alone or in combination with one or more of the first and second aspects, performing the resource exclusion procedure comprises determining the primary resource set and determining the auxiliary resource set.

In a fourth aspect, alone or in combination with one or more of the first through third aspects, determining the primary resource set comprises obtaining, using a first TRP of the plurality of TRPs, a first RSRP measurement corresponding to at least one resource of a set of sidelink resources; obtaining, using a second TRP of the plurality of TRPs, a second RSRP measurement corresponding to the at least one resource of the set of sidelink resources; and determining that at least one of the first RSRP measurement or the second RSRP measurement satisfies an RSRP threshold.

In a fifth aspect, alone or in combination with one or more of the first through fourth aspects, determining the primary resource set comprises obtaining, using a first TRP of the plurality of TRPs, a first RSRP measurement corresponding to at least one resource of a set of sidelink resources; obtaining, using a second TRP of the plurality of TRPs, a second RSRP measurement corresponding to the at least one resource of the set of sidelink resources; determining a derived RSRP measurement based at least in part on a linear combination of the first RSRP measurement and the second RSRP measurement; and determining that the derived RSRP measurement satisfies an RSRP threshold.

In a sixth aspect, alone or in combination with one or more of the first through fifth aspects, performing the resource exclusion procedure comprises determining that an RSRP threshold satisfies a trigger threshold, where determining the auxiliary resource set comprises determining the auxiliary resource set based at least in part on determining that the RSRP threshold satisfies the trigger threshold.

In a seventh aspect, alone or in combination with one or more of the first through sixth aspects, determining the auxiliary resource set comprises determining that the RSRP measurement corresponding to the second resource is greater than or equal to a sum of the RSRP measurement corresponding to the first resource and a value of a threshold parameter.

In an eighth aspect, alone or in combination with one or more of the first through seventh aspects, performing the resource exclusion procedure comprises pruning the auxiliary resource set to determine a pruned auxiliary resource set.

In a ninth aspect, alone or in combination with one or more of the first through eighth aspects, pruning the auxiliary resource set comprises determining a maximum RSRP measurement corresponding to at least one resource of the auxiliary resource set; determining that the maximum RSRP measurement satisfies a pruning threshold; and removing the at least one resource from the auxiliary resource set based at least in part on determining that the maximum RSRP measurement satisfies the pruning threshold.

In a tenth aspect, alone or in combination with one or more of the first through ninth aspects, pruning the auxiliary resource set comprises pruning the auxiliary resource set based at least in part on applying a quantity threshold, the method comprising determining a plurality of maximum RSRP measurements corresponding to at least one resource of the auxiliary resource set, where a maximum RSRP measurement of the plurality of maximum RSRP measurements is associated with a TRP of the plurality of TRPs; determining that the plurality of maximum RSRP measurements satisfy a pruning threshold; determining that a quantity of the plurality of maximum RSRP measurements satisfies the quantity threshold; and removing the at least one resource from the auxiliary resource set based at least in part on determining that the quantity of the plurality of maximum RSRP measurements satisfies the quantity threshold.

In an eleventh aspect, alone or in combination with one or more of the first through tenth aspects, applying the quantity threshold is based at least in part on a quantity of the plurality of TRPs being greater than two.

In a twelfth aspect, alone or in combination with one or more of the first through eleventh aspects, performing the resource exclusion procedure comprises pruning the primary resource set to determine a pruned primary resource set.

In a thirteenth aspect, alone or in combination with one or more of the first through twelfth aspects, pruning the primary resource set comprises determining a maximum auxiliary RSRP measurement associated with the auxiliary resource set or a pruned auxiliary resource set, where the maximum auxiliary RSRP measurement is associated with a TRP of the plurality of TRPs; determining that the maximum auxiliary RSRP measurement is less than an RSRP measurement corresponding to at least one resource in the primary resource set, wherein the RSRP measurement corresponding to the at least one resource in the primary resource set is associated with the TRP; and removing the at least one resource from the primary resource set based at least in part on determining that the maximum auxiliary RSRP measurement is less than the RSRP measurement corresponding to the at least one resource in the primary resource set.

In a fourteenth aspect, alone or in combination with one or more of the first through thirteenth aspects, determining the set of potentially available resources comprises determining a union of the primary resource set and the auxiliary resource set, determining a union of a pruned primary resource set and the auxiliary resource set, determining a union of the primary resource set and a pruned auxiliary resource set, or determining a union of the pruned primary resource set and the pruned auxiliary resource set.

In a fifteenth aspect, alone or in combination with one or more of the first through fourteenth aspects, performing the resource exclusion procedure comprises determining that the set of potentially available resources includes a quantity of potentially available resources; and determining that the quantity of potentially available resources satisfies a selection threshold, where determining the set of available resources comprises determining the set of available resources from the set of potentially available resources.

In a sixteenth aspect, alone or in combination with one or more of the first through fifteenth aspects, performing the resource exclusion procedure comprises determining that the set of potentially available resources includes a quantity of potentially available resources; determining that the quantity of potentially available resources fails to satisfy a selection threshold; and determining, for an additional iteration of the plurality of iterations, an additional set of potentially available resources that is based at least in part on an additional primary resource set and an additional auxiliary resource set.

In a seventeenth aspect, alone or in combination with one or more of the first through sixteenth aspects, the iteration of the plurality of iterations is performed using a first exclusion threshold and the additional iteration of the plurality of iterations is performed using a second exclusion threshold.

In an eighteenth aspect, alone or in combination with one or more of the first through seventeenth aspects, performing the iterative resource exclusion procedure further comprises determining a plurality of maximum auxiliary RSRP measurements associated with the auxiliary resource set or a pruned auxiliary resource set, where the plurality of maximum auxiliary RSRP measurements are associated with the plurality of TRPs; determining a global maximum auxiliary RSRP measurement, wherein the global maximum auxiliary RSRP measurement comprises a maximum of the plurality of maximum auxiliary RSRP measurements; and setting the second exclusion threshold equal to the global maximum auxiliary RSRP measurement.

In a nineteenth aspect, alone or in combination with one or more of the first through eighteenth aspects, performing the iterative resource exclusion procedure further comprises receiving an indication of a directional bias; determining a plurality of bias weights corresponding to the plurality of TRPs; determining a plurality of products of the plurality of bias weights multiplied by a plurality of RSRP measurements associated with the corresponding plurality of TRPs, where the plurality of products are associated with a third resource of the set of sidelink resources; determining that a sum of the plurality of products is less than or equal to an exclusion threshold; and including the third resource in the set of potentially available resources based at least in part on determining that the sum of the plurality of products is less than or equal to the exclusion threshold.

In a twentieth aspect, alone or in combination with one or more of the first through nineteenth aspects, receiving the indication comprises receiving the indication from an application layer of the UE.

In a twenty-first aspect, alone or in combination with one or more of the first through twentieth aspects, determining the set of available resources comprises determining the set of available resources from the set of potentially available resources.

In a twenty-second aspect, alone or in combination with one or more of the first through twenty-first aspects, process 700 includes re-transmitting the sidelink transmission using the set of available resources.

In a twenty-third aspect, alone or in combination with one or more of the first through twenty-second aspects, process 700 includes transmitting the sidelink transmission further comprises transmitting the sidelink transmission using TRP-based power control, where transmitting the sidelink transmission using TRP-based power control comprises transmitting the sidelink transmission at a first transmission power using a first TRP of the plurality of TRPs; and transmitting the sidelink transmission at a second transmission power using a second TRP of the plurality of TRPs, where the first transmission power is greater than the second transmission power.

In a twenty-fourth aspect, alone or in combination with one or more of the first through twenty-third aspects, transmitting the sidelink transmission using TRP-based power control comprises transmitting the sidelink transmission using TRP-based power control based at least in part on determining that a difference between a maximum RSRP measurement associated with the plurality of TRPs and a minimum RSRP measurement associated with the plurality of TRPs satisfies a difference threshold.

In a twenty-fifth aspect, alone or in combination with one or more of the first through twenty-fourth aspects, transmitting the sidelink transmission using TRP-based power control comprises labeling at least one auxiliary resource in the auxiliary resource set to create at least one labeled resource; determining that the set of available resources comprises the at least one labeled resource; and transmitting the sidelink transmission using TRP-based power control based at least in part on determining that the set of available resources comprises the at least one labeled resource.

In a twenty-sixth aspect, alone or in combination with one or more of the first through twenty-fifth aspects, labeling the at least one auxiliary resource comprises setting at least one bit associated with the at least one auxiliary resource to a specified value.

In a twenty-seventh aspect, alone or in combination with one or more of the first through twenty-sixth aspects, transmitting the sidelink transmission using TRP-based power control comprises receiving an indication of a directional bias and transmitting the sidelink transmission using TRP-based power control based at least in part on receiving the directional bias.

In a twenty-eighth aspect, alone or in combination with one or more of the first through twenty-seventh aspects, transmitting the sidelink transmission further comprises transmitting an SCI message associated with the sidelink transmission at the first transmission power using the first TRP and transmitting the SCI message at the first transmission power using the second TRP.

In a twenty-ninth aspect, alone or in combination with one or more of the first through twenty-eighth aspects, the set of available resources comprises at least a time domain resource, a frequency domain resource, or some combination thereof.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

determining a set of available resources for a sidelink transmission by performing an iterative resource exclusion procedure, wherein performing the iterative resource exclusion procedure comprises determining, for an iteration of a plurality of iterations, a set of potentially available resources that is based at least in part on a primary resource set and an auxiliary resource set, wherein the auxiliary resource set comprises a first resource of a set of sidelink resources in a resource selection window having a corresponding reference signal received power (RSRP) measurement that is less than an RSRP measurement corresponding to a second resource of the set of sidelink resources, wherein the primary resource set includes the second resource, wherein determining the set of potentially available resources comprises adding the first resource to the auxiliary resource set based on determining that the RSRP measurement corresponding to the second resource is greater than or equal to a sum of the RSRP measurement corresponding to the first resource and a value of a threshold parameter; and transmitting the sidelink transmission using the set of available resources and at least one transmitter-receiver point (TRP) of a plurality of TRPs of the UE.

2. The method of claim 1, wherein performing the resource exclusion procedure comprises:

obtaining, using a first TRP of the plurality of TRPs, a first RSRP measurement corresponding to at least one resource of a set of sidelink resources;

obtaining, using a second TRP of the plurality of TRPs, a second RSRP measurement corresponding to the at least one resource of the set of sidelink resources; and storing the first RSRP measurement and the second RSRP measurement.

3. The method of claim 2, wherein the first RSRP measurement is associated with a sidelink control information (SCI) message, and wherein the second RSRP measurement is associated with the SCI message.

4. The method of claim 1, wherein performing the resource exclusion procedure comprises:

determining the primary resource set; and determining the auxiliary resource set.

5. The method of claim 4, wherein determining the primary resource set comprises:

obtaining, using a first TRP of the plurality of TRPs, a first RSRP measurement corresponding to at least one resource of a set of sidelink resources;

obtaining, using a second TRP of the plurality of TRPs, a second RSRP measurement corresponding to the at least one resource of the set of sidelink resources; and determining that at least one of the first RSRP measurement or the second RSRP measurement satisfies an RSRP threshold.

6. The method of claim 4, wherein determining the primary resource set comprises: obtaining, using a first TRP of the plurality of TRPs, a first RSRP measurement corresponding to at least one resource of a set of sidelink resources; obtaining, using a second TRP of the plurality of TRPs, a second RSRP measurement corresponding to the at least one resource of the set of sidelink resources; determining a derived RSRP measurement based at least in part on a linear combination of the first RSRP measurement and the second RSRP measurement; and determining that the derived RSRP measurement satisfies an RSRP threshold.

7. The method of claim 4, wherein performing the resource exclusion procedure comprises: determining that an RSRP threshold satisfies a trigger threshold, wherein determining the auxiliary resource set comprises determining the auxiliary resource set based at least in part on determining that the RSRP threshold satisfies the trigger threshold.

8. The method of claim 4, wherein performing the resource exclusion procedure comprises pruning the auxiliary resource set to determine a pruned auxiliary resource set.

9. The method of claim 8, wherein pruning the auxiliary resource set comprises: determining a maximum RSRP measurement corresponding to at least one resource of the auxiliary resource set; determining that the maximum RSRP measurement satisfies a pruning threshold; and removing the at least one resource from the auxiliary resource set based at least in part on determining that the maximum RSRP measurement satisfies the pruning threshold.

10. The method of claim 8, wherein pruning the auxiliary resource set comprises pruning the auxiliary resource set based at least in part on applying a quantity threshold, the method comprising: determining a plurality of maximum RSRP measurements corresponding to at least one resource of the auxiliary resource set, wherein a maximum RSRP measurement of the plurality of maximum RSRP measurements is associated with a TRP of the plurality of TRPs; determining that the plurality of maximum RSRP measurements satisfy a pruning threshold; determining that a quantity of the plurality of maximum RSRP measurements satisfies the quantity threshold; and removing the at least one resource from the auxiliary resource set based at least in part on determining that the quantity of the plurality of maximum RSRP measurements satisfies the quantity threshold.

11. The method of claim 10, wherein applying the quantity threshold is based at least in part on a quantity of the plurality of TRPs being greater than two.

12. The method of claim 4, wherein performing the resource exclusion procedure comprises pruning the primary resource set to determine a pruned primary resource set.

13. The method of claim 12, wherein pruning the primary resource set comprises: determining a maximum auxiliary RSRP measurement associated with the auxiliary resource set or a pruned auxiliary resource set, wherein the maximum auxiliary RSRP measurement is associated with a TRP of the plurality of TRPs; determining that the maximum auxiliary RSRP measurement is less than an RSRP measurement corresponding to at least one resource in the primary resource set, wherein the RSRP measurement corresponding to the at least one resource in the primary resource set is associated with the TRP; and removing the at least one resource from the primary resource set based at least in part on determining that the maximum auxiliary RSRP measurement is less than the RSRP measurement corresponding to the at least one resource in the primary resource set.

14. The method of claim 1, wherein determining the set of potentially available resources comprises: determining a union of the primary resource set and the auxiliary resource set, determining a union of a pruned primary resource set and the auxiliary resource set, determining a union of the primary resource set and a pruned auxiliary resource set, or determining a union of the pruned primary resource set and the pruned auxiliary resource set.

15. The method of claim 1, wherein performing the resource exclusion procedure comprises: determining that the set of potentially available resources includes a quantity of potentially available resources; and determining that the quantity of potentially available resources satisfies a selection threshold, wherein determining the set of available resources comprises determining the set of available resources from the set of potentially available resources.

16. The method of claim 1, wherein performing the resource exclusion procedure comprises: determining that the set of potentially available resources includes a quantity of potentially available resources; determining that the quantity of potentially available resources fails to satisfy a selection threshold; and determining, for an additional iteration of the plurality of iterations, an additional set of potentially available resources that is based at least in part on an additional primary resource set and an additional auxiliary resource set.

17. The method of claim 16, wherein the iteration of the plurality of iterations is performed using a first exclusion threshold, and wherein the additional iteration of the plurality of iterations is performed using a second exclusion threshold.

18. The method of claim 17, wherein performing the iterative resource exclusion procedure further comprises: determining a plurality of maximum auxiliary RSRP measurements associated with the auxiliary resource set or a pruned auxiliary resource set, wherein the plurality of maximum auxiliary RSRP measurements are associated with the plurality of TRPs;

determining a global maximum auxiliary RSRP measurement, wherein the global maximum auxiliary RSRP measurement comprises a maximum of the plurality of maximum auxiliary RSRP measurements; and setting the second exclusion threshold equal to the global maximum auxiliary RSRP measurement.

19. The method of claim 1, wherein performing the iterative resource exclusion procedure further comprises:

receiving an indication of a directional bias;

determining a plurality of bias weights corresponding to the plurality of TRPs;

determining a plurality of products of the plurality of bias weights multiplied by a plurality of RSRP measurements associated with the corresponding plurality of TRPs, wherein the plurality of products are associated with a third resource of the set of sidelink resources;

determining that a sum of the plurality of products is less than or equal to an exclusion threshold; and including the third resource in the set of potentially available resources based at least in part on determining that the sum of the plurality of products is less than or equal to the exclusion threshold.

20. The method of claim 19, wherein receiving the indication comprises receiving the indication from an application layer of the UE.

21. The method of claim 1, wherein determining the set of available resources comprises determining the set of available resources from the set of potentially available resources.

22. The method of claim 1, further comprising re-transmitting the sidelink transmission using the set of available resources.

23. The method of claim 1, wherein transmitting the sidelink transmission further comprises transmitting the sidelink transmission using TRP-based power control, wherein transmitting the sidelink transmission using TRP-based power control comprises:

transmitting the sidelink transmission at a first transmission power using a first TRP of the plurality of TRPs; and transmitting the sidelink transmission at a second transmission power using a second TRP of the plurality of TRPs, wherein the first transmission power is greater than the second transmission power.

24. The method of claim 23, wherein transmitting the sidelink transmission using TRP-based power control comprises transmitting the sidelink transmission using TRP-based power control based at least in part on determining that a difference between a maximum RSRP measurement associated with the plurality of TRPs and a minimum RSRP measurement associated with the plurality of TRPs satisfies a difference threshold.

25. The method of claim 23, wherein transmitting the sidelink transmission using TRP-based power control comprises:

labeling at least one auxiliary resource in the auxiliary resource set to create at least one labeled resource;

determining that the set of available resources comprises the at least one labeled resource; and transmitting the sidelink transmission using TRP-based power control based at least in part on determining that the set of available resources comprises the at least one labeled resource.

26. The method of claim 25, wherein labeling the at least one auxiliary resource comprises setting at least one bit associated with the at least one auxiliary resource to a specified value.

27. The method of claim 23, wherein transmitting the sidelink transmission using TRP-based power control comprises:

receiving an indication of a directional bias; and transmitting the sidelink transmission using TRP-based power control based at least in part on receiving the directional bias.

28. The method of claim 23, wherein transmitting the sidelink transmission further comprises:

transmitting a sidelink control information (SCI) message associated with the sidelink transmission at the first transmission power using the first TRP; and transmitting the SCI message at the first transmission power using the second TRP.

29. The method of claim 1, wherein the set of available resources comprises at least:

a time domain resource, a frequency domain resource, or some combination thereof.

30. A user equipment (UE) for wireless communication, comprising:

one or more memories; and one or more processors operatively coupled to the one or more memories, the one or more memories and the one or more processors configured to:

determine a set of available resources for a sidelink transmission by performing an iterative resource exclusion procedure, wherein performing the iterative resource exclusion procedure comprises determining, for an iteration of a plurality of iterations, a set of potentially available resources that is based at least in part on a primary resource set and an auxiliary resource set, wherein the auxiliary resource set comprises a first resource of a set of sidelink resources in a resource selection window having a corresponding reference signal received power (RSRP) measurement that is less than an RSRP measurement corresponding to a second resource of the set of sidelink resources, wherein the primary resource set includes the second resource, wherein, to determine the set of potentially available resources, the one or more processors are further configured to add the first resource to the auxiliary resource set based on determining that the RSRP measurement corresponding to the second resource is greater than or equal to a sum of the RSRP measurement corresponding to the first resource and a value of a threshold parameter; and transmit the sidelink transmission using the set of available resources and at least one transmitter-receiver point (TRP) of a plurality of TRPs of the UE.

31. A non-transitory computer-readable medium storing a set of instructions for wireless communication, the set of instructions comprising:

one or more instructions that, when executed by one or more processors of a user equipment (UE), cause the UE to:

determine a set of available resources for a sidelink transmission by performing an iterative resource exclusion procedure, wherein performing the iterative resource exclusion procedure comprises determining, for an iteration of a plurality of iterations, a set of potentially available resources that is based at least in part on a primary resource set and an auxiliary resource set, wherein the auxiliary resource set comprises a first resource of a set of sidelink resources in a resource selection window having a corresponding reference signal received power (RSRP) measurement that is less than an RSRP measurement corresponding to a second resource of the set of sidelink resources, wherein the primary resource set includes the second resource, wherein, to determine the set of potentially available resources, the one or more instructions further cause the UE to add the first resource to the auxiliary resource set based on determining that the RSRP measurement corresponding to the second resource is greater than or equal to a sum of the RSRP measurement corresponding to the first resource and a value of a threshold parameter; and transmit the sidelink transmission using the set of available resources and at least one transmitter-receiver point (TRP) of a plurality of TRPs of the UE.

32. An apparatus for wireless communication, comprising:

means for determining a set of available resources for a sidelink transmission by performing an iterative resource exclusion procedure, wherein performing the iterative resource exclusion procedure comprises determining, for an iteration of a plurality of iterations, a set of potentially available resources that is based at least in part on a primary resource set and an auxiliary resource set, wherein the auxiliary resource set comprises a first resource of a set of sidelink resources in a resource selection window having a corresponding reference signal received power (RSRP) measurement that is less than an RSRP measurement corresponding to a second resource of the set of sidelink resources, wherein the primary resource set includes the second resource, wherein determining the set of potentially available resources comprises adding the first resource to the auxiliary resource set based on determining that the RSRP measurement corresponding to the second resource is greater than or equal to a sum of the RSRP measurement corresponding to the first resource and a value of a threshold parameter; and means for transmitting the sidelink transmission using the set of available resources and at least one transmitter-receiver point (TRP) of a plurality of TRPs of the apparatus.

33. The UE of claim 30, wherein, to perform the resource exclusion procedure, the one or more memories and the one or more processors are configured to:

obtain, using a first TRP of the plurality of TRPs, a first RSRP measurement corresponding to at least one resource of a set of sidelink resources;

obtain, using a second TRP of the plurality of TRPs, a second RSRP measurement corresponding to the at least one resource of the set of sidelink resources; and store the first RSRP measurement and the second RSRP measurement.

* * * * *